United States Patent
Tai et al.

(10) Patent No.: US 7,975,037 B2
(45) Date of Patent: Jul. 5, 2011

(54) POLICY ENGINE IN AN INTERNET PROTOCOL MULTIMEDIA SUBSYSTEM

(75) Inventors: Yung-Hwa Tai, Holmdel, NJ (US); Gregory Welch, Somerset, NJ (US); James L. Verlare, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 547 days.

(21) Appl. No.: 11/460,672

(22) Filed: Jul. 28, 2006

(65) Prior Publication Data

US 2007/0027975 A1 Feb. 1, 2007

Related U.S. Application Data

(60) Provisional application No. 60/703,812, filed on Jul. 29, 2005, provisional application No. 60/764,748, filed on Feb. 3, 2006.

(51) Int. Cl.
*G06F 15/173* (2006.01)
*G06F 7/00* (2006.01)

(52) U.S. Cl. ........ 709/223; 709/238; 709/240; 709/242; 707/609

(58) Field of Classification Search ................... 709/223, 709/238, 240, 242
See application file for complete search history.

(56) References Cited

U.S. PATENT DOCUMENTS

| | | | |
|---|---|---|---|
| 5,689,553 A | 11/1997 | Ahuja et al. | |
| 6,282,281 B1 | 8/2001 | Low | |
| 6,578,076 B1 | 6/2003 | Putzolu | |
| 7,031,747 B2 | 4/2006 | Cyr et al. | |
| 7,079,627 B2 | 7/2006 | Crago et al. | |
| 7,155,248 B2 | 12/2006 | Idnani | |
| 7,209,458 B2 | 4/2007 | Ahvonen | |
| 2002/0068545 A1* | 6/2002 | Oyama et al. | 455/406 |
| 2002/0194495 A1* | 12/2002 | Gladstone et al. | 713/200 |
| 2003/0027569 A1 | 2/2003 | Ejzak | |
| 2003/0046396 A1 | 3/2003 | Richter et al. | |
| 2004/0068574 A1 | 4/2004 | Costa Requena et al. | |
| 2004/0109459 A1 | 6/2004 | Madour et al. | |
| 2004/0148416 A1 | 7/2004 | Aarnos | |
| 2004/0190498 A1 | 9/2004 | Kallio et al. | |
| 2005/0050194 A1 | 3/2005 | Honeisen | |
| 2005/0064883 A1 | 3/2005 | Heck et al. | |
| 2005/0071455 A1* | 3/2005 | Collins | 709/223 |
| 2005/0213606 A1 | 9/2005 | Huang et al. | |
| 2006/0104431 A1 | 5/2006 | Emery et al. | |
| 2006/0206504 A1 | 9/2006 | Cai et al. | |

(Continued)

FOREIGN PATENT DOCUMENTS

EP 1 492 267 A2 12/2004

(Continued)

OTHER PUBLICATIONS

Zhuang et al., "Multi-domain architecture for policy management in UMTS IP multimedia subsystem", Ann. Télécommun., 59, n° 1-2, XP-001192424, 2004, pp. 25-37.

(Continued)

*Primary Examiner* — William Vaughn, Jr.
*Assistant Examiner* — Farrukh Hussain

(57) ABSTRACT

A system includes a policy engine in an Internet Protocol Multimedia Subsystem (IMS). The policy engine may be configured to store a group of policies associated with the IMS, and forward the group of policies to a group of policy components in the IMS.

19 Claims, 7 Drawing Sheets

U.S. PATENT DOCUMENTS

| | | | |
|---|---|---|---|
| 2006/0253538 A1 | 11/2006 | Jung et al. | |
| 2006/0270404 A1 | 11/2006 | Tuohino et al. | |
| 2007/0022124 A1* | 1/2007 | Beadles et al. | 707/10 |
| 2007/0204154 A1* | 8/2007 | Swander et al. | 713/166 |
| 2008/0198845 A1* | 8/2008 | Boman | 370/389 |

FOREIGN PATENT DOCUMENTS

| | | |
|---|---|---|
| WO | WO/01/74108 | 10/2001 |
| WO | WO/01/78328 | 10/2001 |
| WO | WO 04/002062 | 12/2003 |
| WO | WO/2004/008786 | 1/2004 |
| WO | WO/2004/071105 | 8/2004 |
| WO | WO/2005/064883 | 7/2005 |

OTHER PUBLICATIONS

Zhuang et al., "Policy-Based QoS Architecture in the IP Multimedia Subsystem of UMTS", IEEE Network, 2003, pp. 51-57.

Böhm et al., "Policy Based Architecture for the UMTS Multimedia Domain", Proceedings of the Second IEEE International Symposium on Network Computing and Applications, 2003, 11 pages.

Supplementary European Search Report, corresponding to PCT/US2006/029658, Feb. 24, 2009, 9 pages.

"Digital cellular telecommunications system (Phase 2+); Universal Mobile Telecommunications System (UMTS); IP Multimedia Subsystem (IMS); Stage 2 (3GPP TS 23.228 version 6.10.0 Release 6); ETSI TS 123 228" ETSI Standards, LIS, Sophia Antipolis Cedex, France, vol. 3-SA2, No. V6.10.0, Jun. 1, 2005 , pp. 1-181.

3GPP: "3rd Generation Partnership Project; Technical Specification Group Services and System Aspects; Internet Protocol (IP) based IP Multimedia Subsystem (IMS) emergency sessions;(Release 7)" 3GPP Draft; S2-051742 23867-100 RM, 3RD Generation Partnership Project (3GPP), Mobile Competence Centre; 650, Route Des Lucioles ; F-06921 Sophia-Antipolis Cedex; France, vol. SA WG2, No. Montreal; 20050622, Jun. 22, 2005, pp. 1-82.

* cited by examiner

POLICY ENGINE IN AN INTERNET PROTOCOL MULTIMEDIA SUBSYSTEM

PRIORITY INFORMATION

The present application claims priority to U.S. Provisional Patent Application No. 60/703,812, filed Jul. 29, 2005, and U.S. Provisional Patent Application No. 60/764,748, filed Feb. 3, 2006. The entire contents of both provisional applications are incorporated herein by reference in their entireties.

BACKGROUND INFORMATION

The Internet Protocol Multimedia Subsystem (IMS) provides mobile and fixed multimedia services. The aim of IMS is not only to provide new services, but all the services, current and future, that the Internet provides. In this way, IMS gives network operators and service providers the ability to control and charge for each service. In addition, users are given the ability to execute services from their home networks, as well as when the users are roaming.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF PREFERRED EMBODIMENTS

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations described herein relate to a policy engine that acts as a central repository for policies within an Internet Protocol (IP) Multimedia Subsystem (IMS). The policy engine may also forward policy updates to the appropriate policy decision points in the IMS so that policy changes can be reflected in real time or near real time.

Exemplary System

Figure 1:
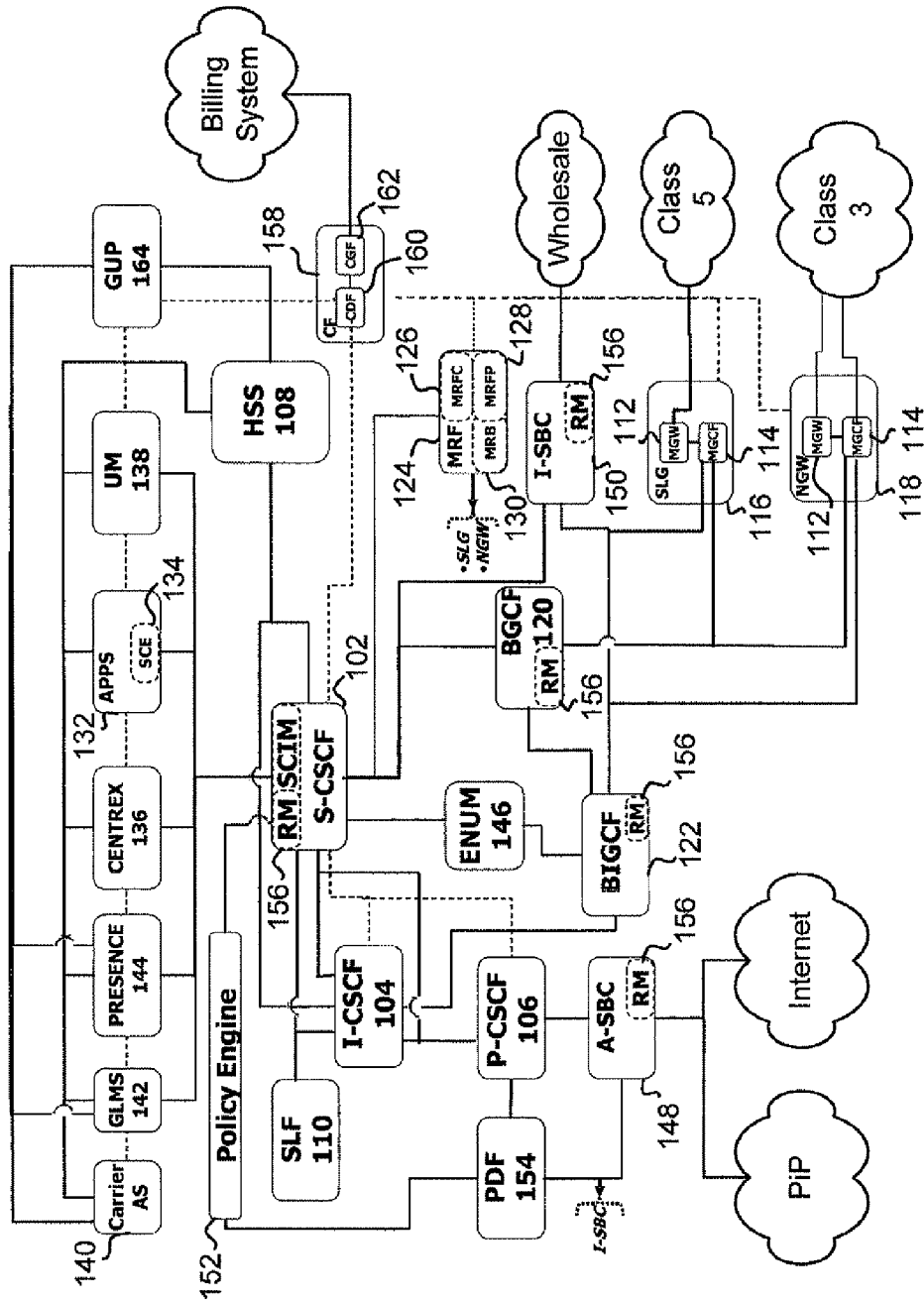
FIG. 1 illustrates an exemplary system in which systems and methods, consistent with principles of the invention, may be implemented.

FIG. 1 illustrates an exemplary system 100 in which systems and methods, consistent with principles of the invention, may be implemented. As illustrated, system 100 may include a serving call session control function (S-CSCF) 102, an interrogating call session control function (I-CSCF) 104, a proxy call session control function (P-CSCF) 106, a home subscriber server (HSS) 108, a subscription location function (SLF) 110, two media gateway (MGW) functions 112, two media gateway control functions (MGCFs) 114, a shared local gateway (SLG) 116, a network gateway (NGW) 118, a breakout gateway control function (BGCF) 120, a break in gateway control function (BIGCF) 122, a multimedia resource function (MRF) 124 that may include a multimedia resource function controller (MRFC) 126, a multimedia resource function processor (MRFP) 128, and a media resource broker (MRB) 130, one or more application servers 132, services creation environment (SCE) logic 134, a central office exchange service (CENTREX) 136, a unified messaging service (UM) 138, a carrier application service (AS) 140, a group list management server (CLMS) 142, a presence service 144, a telephone number mapping (ENUM) server 146, an access session border controller (A-SBC) 148, an interconnection session border controller (I-SBC) 150, a policy engine 152, a policy decision function (PDF) 154, a resource management function (RM) 156, a charging function (CF) 158, a charging data function (CDF) 160, a charging gateway function (CGF) 162, and a generic user profile (GUP) 164. Although not specifically depicted in FIG. 1, the IMS core may include, for example, S-CSCF 102, I-CSCF 104, P-CSCF 106, and HSS 108. The number of components illustrated in FIG. 1 is provided for simplicity. In practice, a typical system could include more or fewer components than illustrated in FIG. 1. Moreover, it will be appreciated that the IMS standards are continually evolving. Implementations described herein are equally applicable to current and future IMS standards.

A. Call Session Control Components

S-CSCF 102, I-CSCF 104, and P-CSCF 106 may be considered call session control components in system 100. The call control components may be responsible for parsing a session (e.g., a session initiation protocol (SIP) session) and applying logic (e.g., business logic, service logic, operational logic, etc.) on a per event basis. The outcome of the session control may be to route an event to the appropriate components and/or append SIP headers and values.

S-CSCF 102 may be viewed as the brain of the IMS core. S-CSCF 102 may perform session control, registration, and service invocation for the users of the IMS core. S-CSCF 102 may receive a user profile from HSS 108 and route sessions requested by an IMS user (also called an "IMS subscriber" or "subscriber"). Additionally, S-CSCF 102 may perform user authentication based on information from HSS 108.

In some implementations, S-CSCF 102 may include a Service Capability Interaction Manager (SCIM) and Resource Management (RM) functions. The SCIM may be responsible for orchestrating the offerings of one or more application services across various service enabling technologies and platforms to produce valued services for IMS users. The RM may be responsible for executing business rules and service level agreements (SLAs) by allocating the appropriate resources. S-CSCF 102 may receive session requests from the following sources: P-CSCF 106, and I-CSCF 104. After service invocation is completed, S-CSCF 102 may disposition the sessions by routing the session requests to the destinations via, for example, P-CSCF 106, BGCF 120, and/or I-SBC 150.

I-CSCF 104 may act as the main point of contact for connections to and from a subscriber in the IMS platform. I-CSCF 104 may be located at the edge of the IMS core. I-CSCF 104 may receive SIP messages and identify the next hops for the SIP messages. To achieve this, I-CSCF 104 may query HSS 108 for the location (e.g., an address) of the appropriate S-CSCF to which a particular SIP message is to be forwarded.

P-CSCF 106 may receive session requests from end points located at both public IP networks and private IP networks. P-CSCF 106 may validate requests, forward the requests to selected destinations, and process and forward the responses. P-CSCF 106 may generate chargeable events and send information relating to the chargeable events to CF 158. Additionally, P-CSCF 106 may interact with PDF 154 to grant, reject, or downgrade a session request based on platform resources and quality of service (QoS) measurements.

HSS 108 may include one or more servers that act as the central repository for user-related information. HSS 108 may contain user-related subscription information for handling multimedia sessions. Some of the information contained in HSS 108 may include information identifying the location of a particular S-CSCF 102 for a particular user. As indicated above, the location of a particular S-CSCF 102 may be conveyed to I-CSCF 104 upon receiving a query from a network element. HSS 108 may also include user profile information that contains service trigger points and information identifying the corresponding resources (e.g., applications, media, services, etc.) that offer the services. The user profile information may be forwarded to S-CSCF 102 for session control and service treatment. Moreover, HSS 108 may provide and receive updates directly from application servers 132.

SLF 110 may include one or more databases that contain subscription location information for subscribers. SLF 110 may receive a query, containing identification information for a subscriber, from I-CSCF 104 and return, based on the subscriber identification information, information identifying an HSS 108 that serves the subscriber.

B. Gateways and Gateway Control Functions

System 100 may include various components that bridge the IMS core to external networks, such as a public switched telephone network (PSTN), the Internet, etc. These components, which may include MGW function 112, MGCF 114, SLG 116, NGW 118, BGCF 120, and BIGCF 122, may perform protocol conversion and event routing to or from the IMS core. In one implementation consistent with principles of the invention, SLG 116 and NGW 118 may be replaced with more generic gateways that include MGW 112 and MGCF 114.

MGW function 112 may connect PSTN networks and the IMS core. In one implementation, MGW function 112 may terminate bearer channels from a PSTN network and media steams from the IMS core (e.g., real-time transport protocol (RTP) streams in an IP network or Asynchronous transfer mode Adaptation Layer 2 (AAL2)/ATM connections in an ATM backbone), execute the conversion between these terminations, and perform transcoding and signal processing. In addition, MGW function 112 may provide tones and announcements to circuit switched (CS) users. In one implementation consistent with principles of the invention, MGW function 112 may operate under the control of MGCF 114.

MGCF 114 may be part of the gateway infrastructure that enables communication between the IMS core and PSTN networks. MGCF 114 may perform protocol conversion between the Integrated Services Digital Network (ISDN) User Part (ISUP) or Primary Rate Interface (PRI) and SIP protocols before forwarding a session to the IMS core. In similar fashion, IMS-originated sessions directed towards PSTN users may traverse MGCF 114. MGCF 114 may control media channels in MGW 112. In addition, MGCF 114 may report account information to CF 158.

SLG 116 may include a set of MGCF 114 and MGW 112 entities. SLG 116 may connect the IMS core to Class 5 networks. In one implementation, the interfaces between SLG 116 and the Class 5 networks may include Digital Signal 1 (DS1)-based Non-Facilities Associated Signaling (NFAS) PRIs.

NGW 118 may include a set of MGCF 114 and MGW 112 entities. NGW 118 may connect the IMS core to Class 3 networks. In one implementation, the interfaces between MGCF 114 of NGW 118 and the Class 3 networks may include DS1-based signaling system 7 (SS7) interfaces and the interfaces between MGW 112 of NGW 118 and Class 3 networks may include DS1-bearer channels.

BGCF 120 may connect IMS-initiated calls to Circuit Switch (CS) customers (e.g., an IMS user calling a telephone number in the PSTN). BGCF 120 may, based on a routing policy, select an appropriate network in which the connection is to be made or may select the appropriate gateway to the other network.

BIGCF 122 may correspond to an ingress point that handles incoming calls from PSTN gateways (e.g., NGW 118, SLG 116), wholesale gateways, other IP-based carriers (e.g., based on Voice over Internet Protocol (VoIP) peering agreements), Intrado Peering Points, etc. BIGCF 122 may route calls from and to non-IMS subscribers. BIGCF 122 may route calls to the IMS core, when the calls are destined for IMS subscribers or when IMS applications are invoked, or may bypass the IMS core elements (P-CSCF 106, I-CSCF 104, S-CSCF 102, HSS 108, etc.) when calls are destined for non-IMS subscribers and no IMS applications are invoked by the calling party or called party. BIGCF 122 may route calls to PSTN-based termination points to BGCF 120 and route calls to IP-based termination points (e.g., a wholesale termination point, IP-based carriers, etc.) directly to I-SBCs 150 associated with the IP-based termination points. If calls are either from and/or to IMS subscribers or IMS applications (or services) are invoked, BIGCF 122 may route the calls to the IMS core via I-CSCF 104 and using S-CSCF 102 to invoke calling and/or called party features.

C. Multimedia Resource Function (MRF)

The IMS core may provide multimedia services. Examples of multimedia services (or applications) include playing announcements, audio/video recording and playback, interactive voice response (IVR), fax reception and transmission, automatic speech recognition (ASR), text-to-speech conversion (TTS), multimedia conferencing, customized ring back tones, push-to-talk over cellular (PoC), video messaging, etc. MRF 124 may be part of the IMS core and may support services that use multimedia streams.

As illustrated in FIG. 1, MRF 124 may include MRFC 126, MRFP 128, and MRB 130. MRFC 126 and MRFP 128 are the IMS resources that provide support for bearer-related services (e.g., multi-party sessions, announcements to a user, bearer transcoding, etc.). MRFC 126 may provide bearer control-related services. MRFP 128 may provide user plane resources that may be requested and instructed by MRFC 126. MRB 130 may provide a resource management function that is able to allow media resources to become common resources shared among multiple applications.

D. Application Servers

Application servers 132 may include one or more servers that provide enhanced audio, video, messaging and data services within the application layer of system 100. Application servers 132 may be accessible to the users of the IMS core and provide value added multimedia services to those users.

Application servers 132 may submit charges to the IMS core for the services that application servers 132 provide to the IMS user community.

Two types of application servers that may be used within system 100 may include micro applications and macro applications (or macro application services). Micro applications may be provided on a common services delivery platform through the use of SCE logic 134. Micro applications may include a wide variety of enhanced multimedia services that need a rapid development and deployment cycle. One example of the Micro applications is the Carrier AS 140. Macro application services may include Hosted IP CENTREX (HIPC) 136, Unified Messaging (UM) 138, Presence 144, and GLMS 142.

CENTREX 136 may correspond to a type of Private Branch Exchange (PBX) service in which switching occurs at a local telephone office instead of at the company premises where the traditional PBX is located. In one implementation, CENTREX 136 may be replaced by or supplemented with a SIP Voice Features server. Unified messaging 138 may allow users to be able to retrieve and send voice messages from a single interface, regardless of the technology (e.g., telephone, personal computer, etc.) and may provide other unified messaging services (e.g., fax deposit retrieval, voice to email, etc.). Carrier AS 140 may facilitate tool free call processing.

E. Services Creation Environment (SCE)

SCE logic 134 may provide a foundation for rapid development of next generation services. SCE 134 may support Java Specification Request (JSR) 116 SIP Servlet and a suite of externalized application programming interfaces (APIs) for developers to gain access to the IMS core. A single SCE 134 may support a number of macro application servers and may support the building of micro applications.

F. Services

The IMS core may support a number of different services, such as GLMS 142, Presence 144, and ENUM server 146. GLMS 142 may include one or more services that allow for group list creation, management, and use across multiple applications within the IMS core. GLMS 142 may enforce access and visibility rules. Presence 144 may include one or more services that automate the task of aggregating both presence and availability information. Presence 144 may inform one user about the status of another user's availability and willingness to communicate. Presence servers 144 may use a Presence User Agent (PUA) to manage the presence of the IMS subscribers and handle presence subscription requests. For example, an application or an IMS subscriber may act as a watcher, which is an entity that subscribes to presence information provided by Presence Server 144. ENUM server 146 may provide translation of E.164 to SIP URIs. BIGCF 122 and S-CSCF 102 may query ENUM server 146 to determine a next hop for a call. In some implementations consistent with principles of the invention, BIGCF 122 may execute ENUM queries for both calling and called number resolution.

G. Border Elements

The IMS core may include one or more session border controllers (SBCs) that provide control of the boundary between different service provider networks, provide signaling protocol inter-working between the SIP-based IMS core and other service provider networks, control the transport boundary between service provider networks, and provide usage metering and Quality of Service (QoS) measurements for media flows. Two types of SBCs that may be associated with the IMS core are the A-SBC 148 and the I-SBC 150. In other implementations, A-SBC 148 and I-SBC 150 may be replaced with border gateway functions.

A-SBC 148 may correspond to an ingress point to the IMS core for Customer Premises Equipment (CPE) traffic. A-SBC 148 may provide SIP aware firewall capabilities that support network address translation (NAT), prevent denial of service (DoS) attacks, and execute other security enforcement features. A-SBC 148 may be the first SIP events normalization point prior to the IMS core.

I-SBC 150 may serve as a connection point between the IMS core and wholesale gateways and also between the IMS core and IP peering VoIP carriers. I-SBC 150 may provide SIP normalization and Topology Hiding and Internetwork Gateway (THIG) services.

H. Policy

System 100 may include a number of policy components. For example, system 100 may, as illustrated in FIG. 1, include a policy engine 152, a PDF 154, and a RM 156. Policy engine 152 may include one or more rule-based engines that govern subscriber access to the IMS core, subscriber access to resources, and routing decisions for several different types of event requests made within the IMS core. In one implementation, policy engine 152 may provide decision logic to policy components (also called "policy decision points") within the IMS core. Policy engine 152 may manage two general categories of resources: 1) network bandwidth resources related to the transport of multimedia content streams, and 2) application resources related to the service logic and media processing used to initiate and control multimedia content streams. Policy engine 152 may maintain real time information regarding the state of all resource requests (e.g., bandwidth requests, media requests, etc.) being made in system 100 and update the appropriate policy components (e.g., PDF 154 and/or RM 156) in system 100 based on the real time information. Moreover, policy engine 152 may allow for policies to be created, modified, and/or deleted and may update the appropriate policy components (e.g., PDF 154 and/or RM 156) in real time to reflect the policy changes. Policy engine 152 may interface with PDF 154 and RM 156 using the extensible markup language (XML) protocol. Policy engine 152 may also interface with one or more external operations support systems (OSSs) (not shown) for policy creation, modification, and/or deletion and with one or more network management systems for obtaining resource status updates.

PDF 154 may provide service-based local policy control. PDF 154 may make policy decisions based on session and media related information. PDF 154 may exchange this decision information with another IMS element (such as A-SBC 148 or I-SBC 150) to control the flow and characteristics of a communication link. PDF 154 may manage the bandwidth resources. PDF 154 may act as a sub-component of the platform border signaling elements (P-CSCF 106, BIGCF 122, BGCF 120, and SBCs 148 and 150) and enforce policies to ensure that multimedia streams are transported with the proper bandwidth utilization properties and Quality of Service (QoS) in accordance with subscriber service level agreements (SLAs).

RM 156 may be used to execute a policy at the component level. As illustrated in FIG. 1, RM 156 may be associated with, for example, S-CSCF 102, BIGCF 122, A-SBC 148, and I-SBC 150. In one implementation, RM 156 may store and execute the policy decisions that are relevant for the location at which RM 156 is associated.

I. Charging Function (CF)

CF 158 may include a unified system for affecting both offline charging and online charging. Offline charging is a process where charging information for network resource usage is collected concurrently with that resource usage. The charging information may be passed through a chain of CFs 158. At the end of this process, Charging Detail Record (CDR) files may be generated by the network, which are then transferred to the network operator's billing domain for the purpose of subscriber billing.

Online charging is a process where the actual charging for network resource usage occurs in real time concurrently with that resource use. The charges may be debited from an appropriately funded subscriber account. An example of online charging includes pre-paid calling card usage.

CDF 160 may compile chargeable events gathered from IMS components into a single Charging Detail Record (CDR) for offline billing activities. CDF 160 may gather the chargeable events from a Charging Trigger Function (CTF) that may be associated with components of system 100 and, after creating the CDR, pass the billing data to the CGF 162.

CGF 162 may act as a gateway between both the offline charging system, the online system, and an external post-processing system, such as a billing domain.

J. The Generic User Profile (GUP)

GUP 164 may include a collection of data that is stored and managed by different entities, such as the user equipment, the home environment, the visited network, and the value added service providers, which affects the way in which an individual user experiences services. CUP 164 may include a number of user profile components, and an individual service may make use of a subset of the available user profile components.

Exemplary Configuration of Policy Engine

Figure 2:
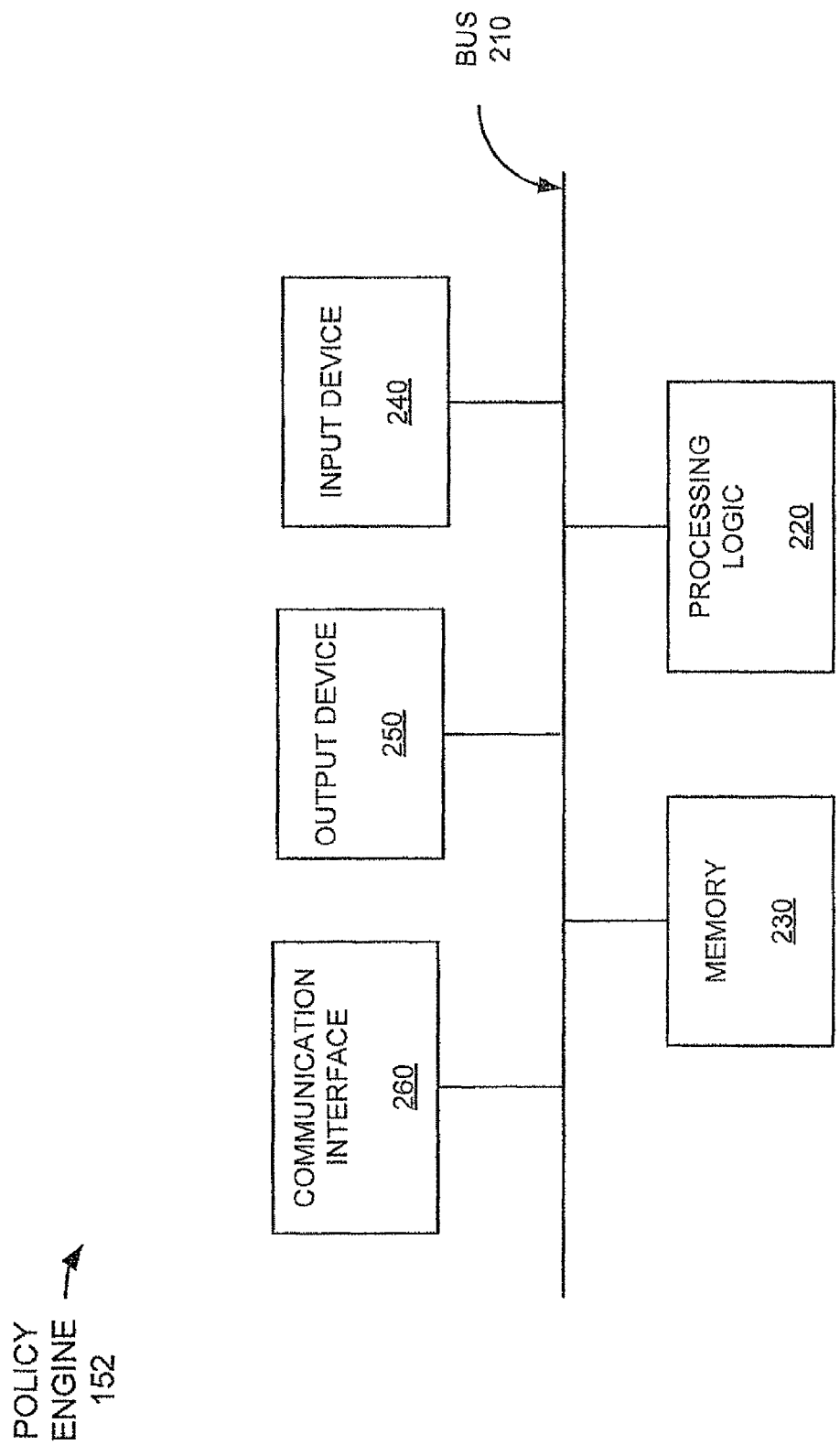
FIG. 2 illustrates an exemplary configuration of the policy engine of FIG. 1.

FIG. 2 illustrates an exemplary configuration of policy engine 152. As illustrated, policy engine 152 may include a bus 210, processing logic 220, a memory 230, an input device 240, an output device 250, and a communication interface 260. It will be appreciated that policy engine 152 may include other components (not shown) that aid in receiving, transmitting, and/or processing data. Moreover, it will be appreciated that other configurations are possible.

Bus 210 may permit communication among the components of policy engine 152. Processing logic 220 may include any type of processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that stores information and instructions for execution by processing logic 220, a read only memory (ROM) or another type of static storage device that stores static information and instructions for the processing logic 220, and/or some other type of magnetic or optical recording medium and its corresponding drive for storing information and/or instructions.

Input device 240 may include a device that permits an operator to input information to policy engine 152, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables policy engine 152 to communicate with other devices and/or systems. For example, communication interface 260 may include mechanisms for communicating with other components within system 100.

As will be described in detail below, policy engine 152 may perform processing associated with maintaining and providing policies in the IMS. Policy engine 152 may perform these and other functions in response to processing logic 220 executing software instructions contained in a computer-readable medium, such as memory 230. A computer-readable medium may be defined as one or more memory devices and/or carrier waves. The software instructions may be read into memory 230 from another computer-readable medium or from another device via communication interface 260. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary Database

Figure 3:
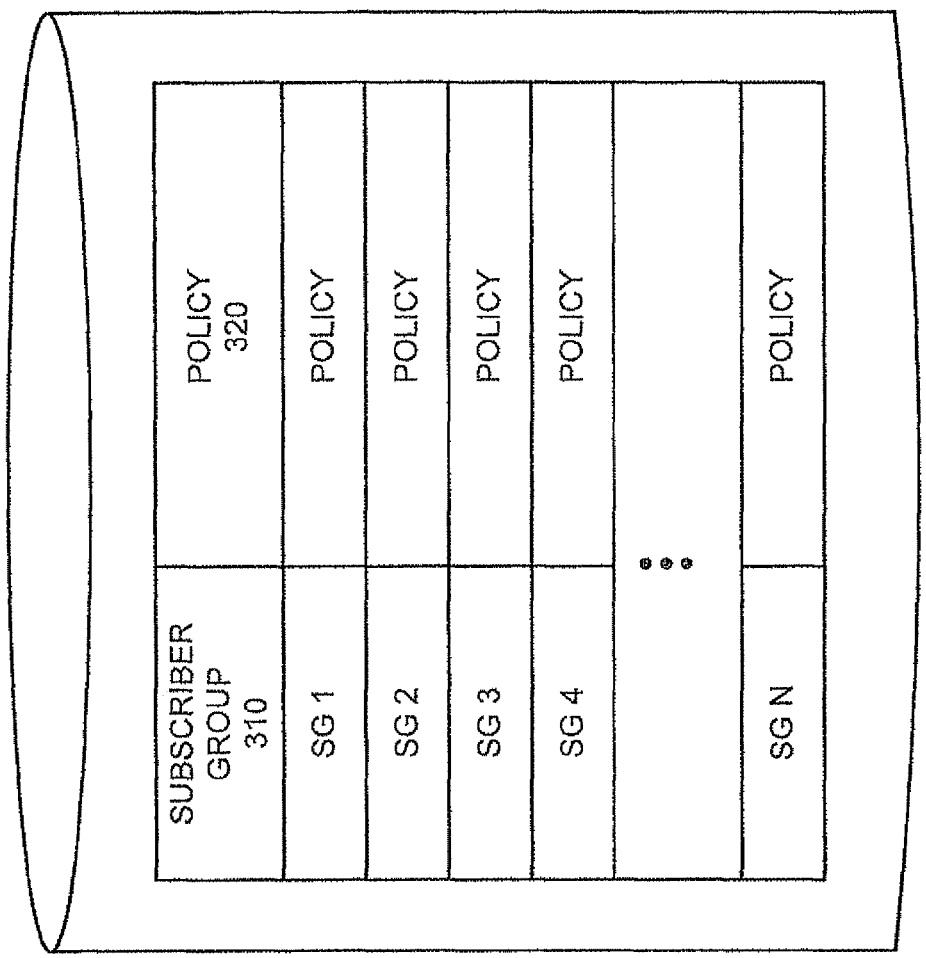
FIG. 3 illustrates an exemplary database that may be associated with the policy engine of FIG. 1.

FIG. 3 is a diagram of an exemplary database 300 that may be associated with policy engine 152 in an exemplary implementation. While only one database is described below, it will be appreciated that policy engine 152 may be associated with additional databases stored locally at policy engine 152, such as in memory 230, or distributed throughout system 100.

As illustrated, database 300 may include a subscriber group field 310 and a policy field 320. Database 300 may include other fields that facilitate associating policies with individual subscribers and/or subscriber groups and/or providing policies to policy decision points in system 100. For example, database 300 may include an additional field that associates a subscriber with the subscriber group to which the subscriber belongs.

Subscriber group field 310 may store information that uniquely identifies an IMS subscriber group. A subscriber group may include, for example, a company, a wholesaler/retailer, etc. Each subscriber group may include one or more IMS subscribers or groups of IMS subscribers.

Policy field 320 may include information identifying one or more policies with which the subscriber group in subscriber group field 310 is associated. The policies may include, for example, resource policies and/or bandwidth and service level agreement policies. The resource policies may define the types of resources and their specifications for various subscriber groups identified in subscriber group field 310. In some exemplary implementations, a resource policy may specify a resource or group of resources as "guaranteed" or "shared." In one exemplary implementation, a premium subscriber group may be allocated a "guaranteed" resource policy, which may guarantee that resources will be available, while a normal subscriber group may be allocated a "shared" resource policy, which may indicate that there is no guarantee resources will be available. The resource policy may also specify, for example, the "time of day" that a resource (or group of resources) is guaranteed or the "day of the week" the resource (or group of resources) is "shared."

In some implementations consistent with principles of the invention, the resource policies may be configurable by geographical location. For example, a particular resource policy associated with a subscriber in North America may specify resources from North America, rather than, for example, Asia.

The resources identified in the resource policies may include a set of session control signaling and computing resources that are used to provide value-added multimedia services to IMS subscribers. For example, the resources may include application servers (e.g., pre-paid applications), as well as media processing servers (e.g., announcement and IP interactive voice response (IVR) servers).

The bandwidth and service level agreement policies may define the bandwidth and quality of service to which the corresponding subscriber group is associated. In some implementations, a subscriber group may be associated with more than one bandwidth specification and more than one service level agreement.

Exemplary Processing

Figure 4:
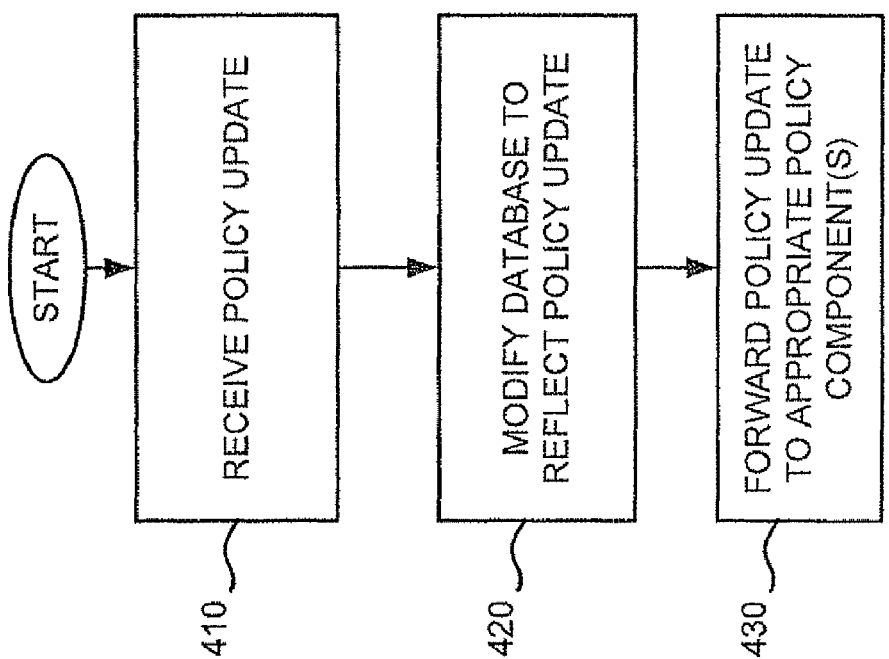
FIG. 4 illustrates a flow chart of exemplary processing in an exemplary implementation.

FIG. 4 is a flowchart of an exemplary process for providing policy updates in an IMS system in an exemplary implementation. The processing described in FIG. 4 may be implemented by policy engine 152. Processing may begin with policy engine 152 receiving a policy update (block 410). The policy update may include, for example, a new policy to be added, a modification to an existing policy, a deletion of an existing policy, a change in assignment of a policy to a subscriber group, etc. Policy engine 152 may receive the policy update from, for example, an OSS provisioning device.

Policy engine 152 may modify database 300 to reflect the policy update (block 420). For example, policy engine 152 may store a new policy in database 300 and/or another location associated with policy engine 152, update a policy in database 300 and/or another location associated with policy engine 152, delete a policy from database 300 and/or another location associated with policy engine 152, etc.

Policy engine 152 may forward the policy update to the appropriate policy component(s) (block 430). For example, policy engine 152 may forward the policy update to the appropriate PDF 154 and/or appropriate RM(s) 156 associated with S-CSCF 102, P-CSCF 106, BGCF 120, BIGCF 122, A-SBC 148, and/or I-SBC 150. Policy engine 152 may identify the appropriate policy component(s) based on a number of factors. For example, policy engine 152 may identify the appropriate policy components based on the geographical location of the resource(s) to which the policy (e.g., new, updated, and/or deleted) is associated. Policy engine 152 may also or alternatively identify the policy component(s) based on the policy that is being added, updated, deleted, etc. For example, if the policy is a resource policy, policy engine 152 may identify RM 156 associated S-CSCF 102 as the policy component to which the policy update is to be forwarded. As another example, if the policy is a service level agreement policy, policy engine 152 may identify one or more PDFs 154 and/or RMs 156 associated P-CSCF 106, BGCF 120, BIGCF 122, A-SBC 148, and/or I-SBC 150 as the policy component(s) to which the policy update is to be forwarded.

In one exemplary implementation, policy engine 152 may forward the policy update to the appropriate policy component(s) using the XML protocol. Policy engine 152 may automatically update the appropriate policy components in response to receiving the policy update. In this way, policy updates can be reflected in the IMS in real time or near real time.

Figure 5:
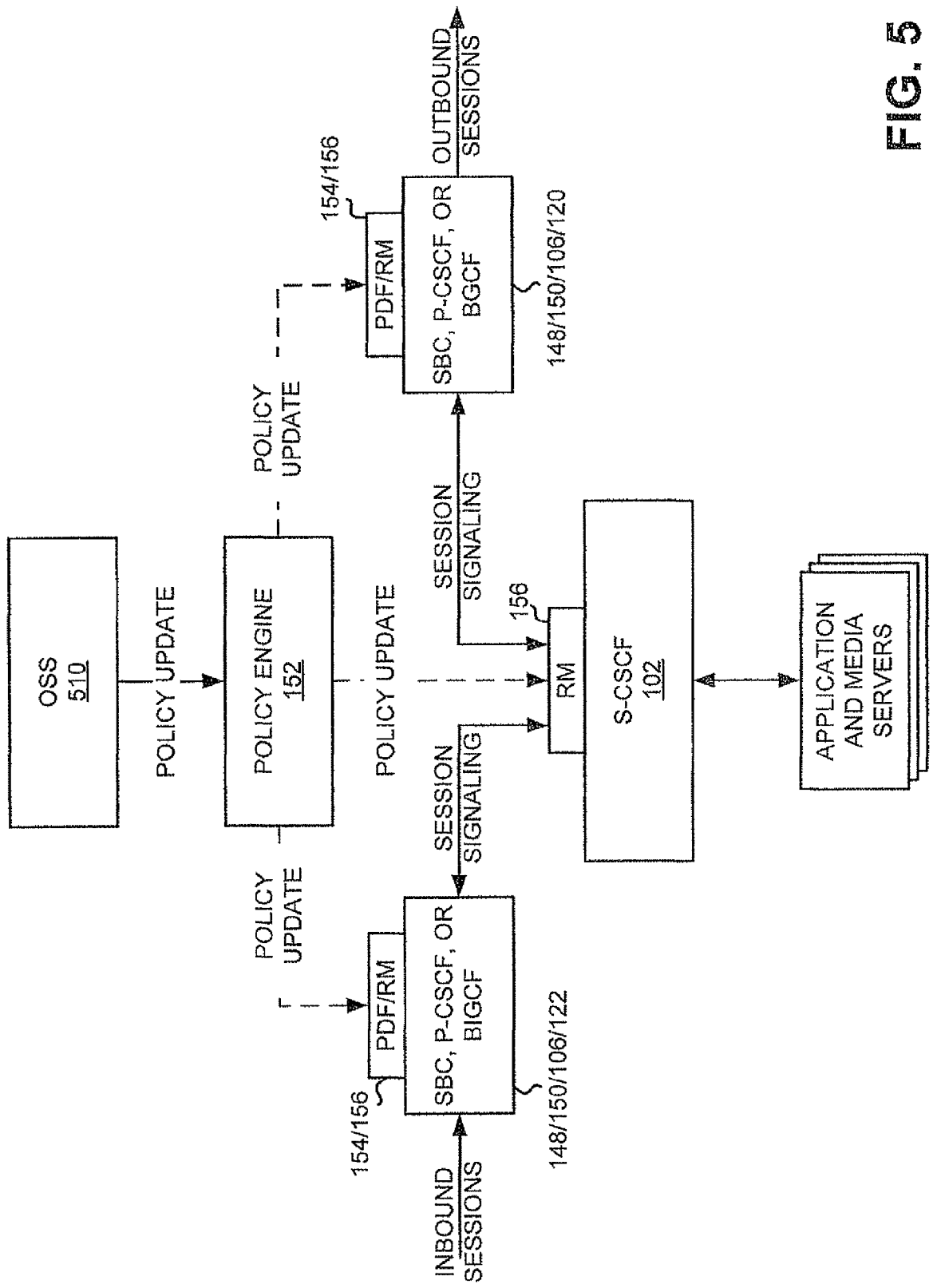
FIG. 5 illustrates an example of the processing described with respect to FIG. 4.

FIG. 5 an example of the processing described above with respect to FIG. 4. As illustrated in FIG. 5, assume that an OSS provision system 510 updates a policy within policy engine 152. In response to the policy update, policy engine 152 may provide the policy update to the appropriate policy component(s), such as the appropriate PDF 154 and/or appropriate RM(s) 156 associated with S-CSCF 102, P-CSCF 106, BGCF 120, BIGCF 122, A-SBC 148, and/or I-SBC 150. In this way, policy updates can be reflected in the IMS in real time or near real time.

Figure 6:
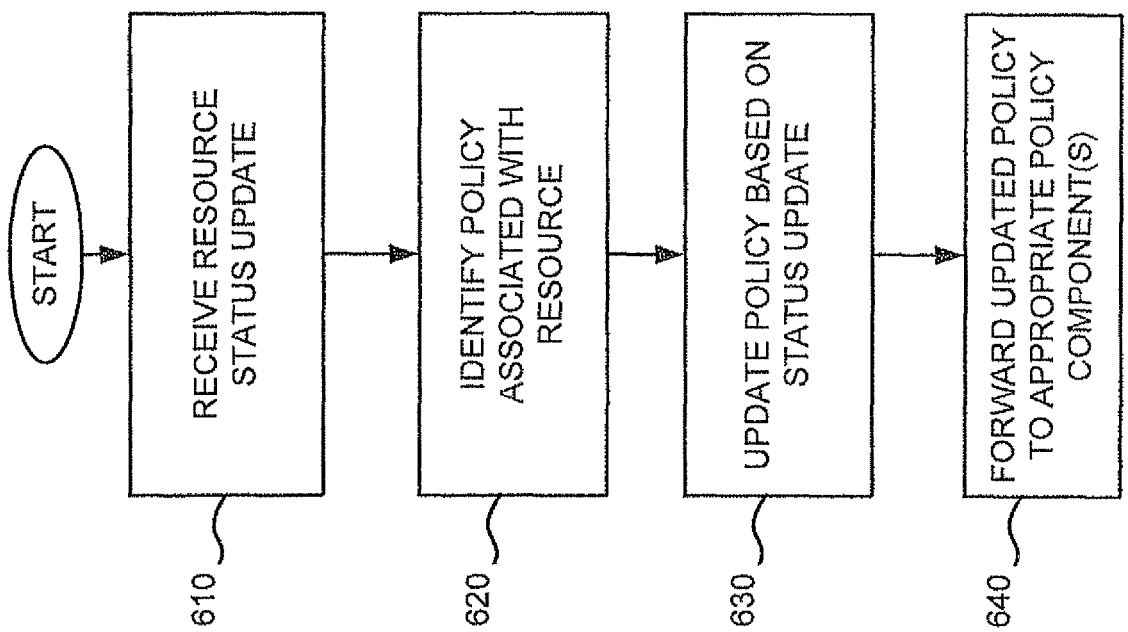
FIG. 6 illustrates a flow chart of exemplary processing in another exemplary implementation.

FIG. 6 is a flowchart of an exemplary process for updating a policy in response to network conditions. The processing described in FIG. 6 may be performed by policy engine 152. Processing may begin with policy engine 152 receiving a resource status update (block 610). The resource status update may include, for example, an indication of a change in status of a resource or group of resources in system 100. In one exemplary implementation, a network management system may monitor the resources, such as application and media servers, in system 100. If, for example, a failure occurs in one or a group of application servers, the network management system may notify policy engine 152 of this failure.

Policy engine 152 may identify a policy that is associated with the resource or group of resources (block 620). For example, policy engine 152 may analyze the policies stored in database 300 to identify the policy and identify the policy or policies that specify the particular resource or group of resources.

Policy engine 152 may update the identified policy based on the resource status update (block 630). For example, assume that a subscriber group has a service level agreement policy for a number of conference ports. If the ports are fully occupied, then a subsequent request from the subscriber group may be denied. However, assume that the subscriber group has a subset of premium subscribers who are guaranteed to always have access to a conference port. In this situation, policy engine 152 may modify a policy to reserve a number of the ports dynamically for the premium subscribers.

Policy engine 152 may forward the policy update to the appropriate policy component(s) (block 640). For example, policy engine 152 may forward the policy update to the appropriate PDF 154 and/or appropriate RM(s) 156 associated with S-CSCF 102, P-CSCF 106, BGCF 120, BIGCF 122, A-SBC 148, and/or I-SBC 150. Policy engine 152 may identify the appropriate policy component(s) based on a number of factors. For example, policy engine 152 may identify the appropriate policy components based on the geographical location of the resource(s) to which the policy (e.g., new, updated, and/or deleted) is associated. Policy engine 152 may also or alternatively identify the policy component(s) based on the policy that is updated. For example, if the policy is a resource policy, policy engine 152 may identify RM 156 associated S-CSCF 102 as the policy component to which the policy update is to be forwarded. As another example, if the policy is a service level agreement policy, policy engine 152 may identify one or more PDFs 154 and/or RMs 156 associated P-CSCF 106, BGCF 120, BIGCF 122, A-SBC 148, and/or I-SBC 150 as the policy component(s) to which the policy update is to be forwarded.

In one exemplary implementation, policy engine 152 may forward the policy update to the appropriate policy component(s) using the XML protocol. Policy engine 152 may automatically update the appropriate policy components in response to receiving the resource status update. In this way, policy updates can be reflected in the IMS in real-time.

Figure 7:
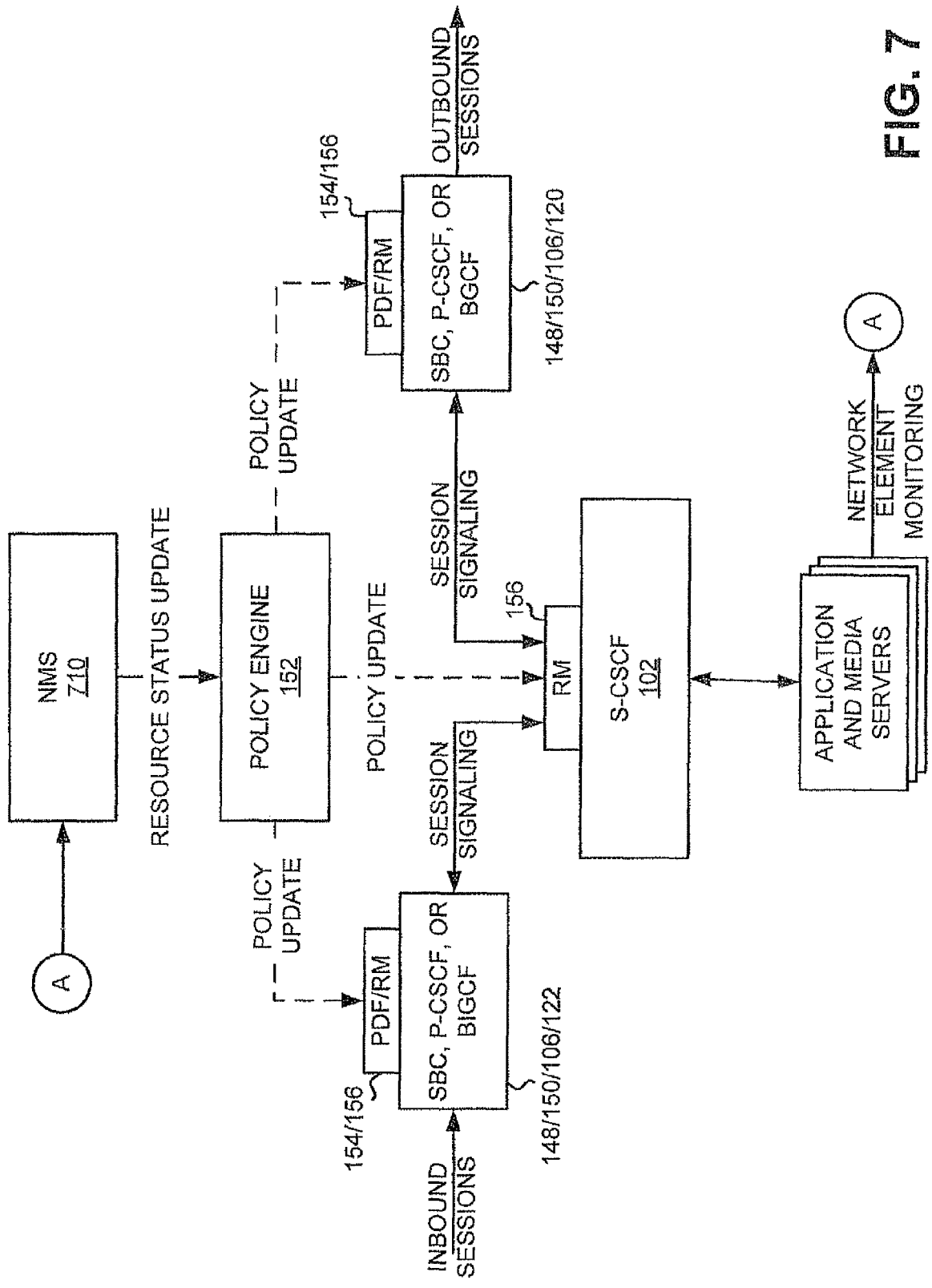
FIG. 7 illustrates an example of the processing described with respect to FIG. 6.

FIG. 7 shows an example of the processing described above with respect to FIG. 6. As illustrated in FIG. 6, a network management system (NMS) 710 may monitor a group of application and media servers. Assume, for this example, that a particular subscriber has guaranteed service to a particular application server. Moreover, assume that the group of application servers to which the particular subscriber is associated fails. Network management system 710 may send a resource status update to policy engine 152 to notify policy engine 152 of this status change. In response, policy engine 152 may identify the policy (or policies) associated with this group of application servers. The identified policy (or policies) may include a policy associated with the particular subscriber. Policy engine 152 may update the policy to, for example, associate the particular subscriber with a different application server or group of application servers. Policy engine 152 may provide the policy update to the appropriate policy component(s), such as the appropriate PDF 154 and/or appropriate RM(s) 156 associated with S-CSCF 102, P-CSCF 106, BGCF 120, BIGCF 122, A-SBC 148, and/or I-SBC 150. In this way, changes in network resource status can be reflected in the IMS in real time or near real time.

CONCLUSION

Implementations described herein provide a centralized policy repository for an IMS. Via the centralized policy repository, policy decision points can be updated in real time to reflect changing policies and/or current network conditions.

The foregoing description of exemplary implementations provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 4 and 6, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
a database to:
store a plurality of associations of information, relating to subscribers, and policies relating to a communications network, the communications network providing at least one service to which the subscribers subscribe, the policies including a first type of policy and a second type of policy, the first type of policy being different than the second type of policy;
a policy engine comprising:
a processor to:
receive an update to one association of the plurality of associations stored in the database, and
forward the update in response to receiving the update; and
a group of policy components, the group of policy components including a first policy component to enforce the first type of policy and a second policy component to enforce the second type of policy, at least one policy component, of the group of policy components, being to:
receive the update from the policy engine,
store the update, and
process a received communication request based on the update,
where the processor is further to:
forward, to the first policy component and not to the second policy component, the first type of policy, and
forward, to the second policy component and not to the first policy component, the second type of policy,
where the processor is still further to:
receive status information relating to the communications network,
update, in response to receiving the status information, at least one policy of the policies, and
forward, in response to updating the at least one policy, the update to the at least one policy to a policy component of the group of policy components, and
where the policy component is to:
receive the update to the at least one policy from the policy engine,
store the received update to the at least one policy, and
process a different communication request using the update to the at least one policy.

2. The system of claim 1 where the subscribers include subscribers to an Internet Protocol Multimedia Subsystem (IMS).

3. The system of claim 1 where the updated policy relates to a network resource identified in the status information.

4. A system comprising:
a policy engine in a communications network that includes a plurality of policy components, the plurality of policy components including a first policy component and a second, different policy component, the policy engine comprising:
a memory to store a plurality of associations of information, relating to subscribers, and a plurality of policies relating to the communications network, the communications network providing at least one service to which the subscribers subscribe, the plurality of policies including a first type of policy and a second type of policy, the first type of policy being different than the second type of policy, and
a processor to:
forward, to the first policy component and not to the second policy component, the first type of policy,
forward, to the second policy component and not to the first policy component, the second type of policy,
receive status information relating to the communications network,
update, in response to receiving the status information, at least one policy of the plurality of policies stored in the memory, and
forward, in response to updating the at least one policy, the update to a policy component, of the plurality of policy components, in the communications network,
the policy component is to:
receive the update to the at least one policy from the policy engine,
store the received update to the at least one policy, and
process a communication request using the update to the at least one policy, where the processor is further to:
receive an update to one association of the plurality of associations stored in the memory, and
forward the update to the one association in response to receiving the update to the one association, and
where one policy component, of the plurality of policy components, is to:
receive the update to the one association,
store the update to the one association, and
process a different communication request based on the update to the one association.

5. The system of claim 4 where the status information identifies one or more resources.

6. The system of claim 4 where the policy component includes at least one of a border gateway function, a serving call session control function (S-CSCF), a proxy call session control function (P-CSCF), a breakout gateway control function (BGCF), or a break in gateway control function (BIGCF).

7. The system of claim 4 where the communications network includes an Internet Protocol Multimedia Subsystem (IMS), and
where the memory stores a copy of all policies used in the IMS.

8. The system of claim 4 where the processor forwards the update to the at least one policy component using an extensible markup language (XML) protocol.

9. A method comprising:
storing, at a policy engine, a plurality of associations of information, relating to subscribers, and a plurality of policies relating to a communications network, the communications network providing at least one service to which the subscribers subscribe, the plurality of policies including a first type of policy and a second type of policy, the second type of policy being different than the first type of policy;
forwarding, by the policy engine, the first type of policy, of the plurality of policies, to a first policy decision point;
forwarding, by the policy engine, the second type of policy, of the plurality of policies, to a second policy decision point, the second policy decision point being different than the first policy decision point;
receiving, by the policy engine, information affecting the first type of policy, the information affecting the first type of policy including first status information relating to the communications network or a first update to one association of the plurality of associations;
forwarding, by the policy engine and based on receiving the information affecting the first type of policy, an update to the first type of policy to the first policy decision point;
processing, by the first policy decision point, a received communication based on the update to the first type of policy;
receiving, by the policy engine, information affecting the second type of policy, the information affecting the second type of policy including second status information relating to the communications network or a second update to one association of the plurality of associations;
forwarding, by the policy engine and based on receiving the information affecting the second type of policy, an update to the second type of policy to the second policy decision point; and
processing, by the second policy decision point, another received communication based on the update to the second type of policy.

10. The method of claim 9 where one of the first status information or the second status information includes a resource status message identifying one or more resources.

11. The method of claim 9 where the communications network includes an Internet Protocol Multimedia Subsystem (IMS), and
where each policy of the plurality of policies relates to accessing the IMS.

12. The method of claim 9 where the processing the received communication includes:
routing, via the first policy decision point, traffic through the communications network based on the update to the first type of policy; and
where the processing the received other communication includes:
routing, via the second policy decision point, traffic through the communications network based on the update to the second type of policy.

13. The system of claim 1, where the group of policy components correspond to policy decision points.

14. The system of claim 1, where the first type of policy includes a resource policy,
where the second type of policy includes a service level agreement policy,
where the first policy component is implemented in a serving call session control function (S-CSCF), and
where the second policy component is implemented in one or more of a proxy call session control function (P-CSCF), a breakout gateway control function (BGCF), a break in gateway control function (BIGCF), an access session border controller (A-SBC), or an inter-networking session border controller (I-SBC).

15. The system of claim 1, where the first policy component is implemented in a gateway-related device of the communications network, and
where the second policy component is implemented in a core of the communications network.

16. The system of claim 4, where the at least one policy includes a resource policy, and
where the policy component is implemented in a serving call session control function (S-CSCF).

17. The system of claim 4, where the at least one policy includes a resource policy, and
where the policy component is implemented in a device in a core of the communications network.

18. The method of claim 9, where the first type of policy includes a resource policy,
where the second type of policy includes a service level agreement policy,
where the first policy decision point is implemented in a serving call session control function (S-CSCF), and
where the second policy decision point is implemented in one or more of a proxy call session control function (P-CSCF), a breakout gateway control function (BGCF), a break in gateway control function (BIGCF), an access session border controller (A-SBC), or an inter-networking session border controller (I-SBC).

19. The method of claim 9, where the forwarding the first type of policy includes:
forwarding the first type of policy to the first policy decision point using an extensible markup language (XML) protocol, and
where the forwarding the second type of policy includes:
forwarding the second type of policy to the second policy decision point using the XML protocol.

* * * * *